No. 844,538. PATENTED FEB. 19, 1907.
W. C. RICHARDSON.
APPARATUS FOR MAKING COFFEE.
APPLICATION FILED FEB. 26, 1906.

WITNESSES:

INVENTOR
BY
ATTORNEYS.

UNITED STATES PATENT OFFICE.

WILLIAM C. RICHARDSON, OF PHILADELPHIA, PENNSYLVANIA.

APPARATUS FOR MAKING COFFEE.

No 844,538.  Specification of Letters Patent.  Patented Feb. 19, 1907.

Application filed February 26, 1906. Serial No. 302,974.

*To all whom it may concern:*

Be it known that I, WILLIAM C. RICHARDSON, a citizen of the United States, residing at Philadelphia, county of Philadelphia, and State of Pennsylvania, have invented a new and useful Improvement in Apparatus for Making Coffee, of which the following is a full, clear, and exact description, reference being had to the accompanying drawings, which form a part of this specification.

The object of my invention is to produce an improved device in which the device as a whole will enable coffee to be made of any desired strength without losing any of its aroma, while one part of the device may be used as the ordinary pot for serving the coffee when made.

I will first describe the embodiment of my invention as illustrated in the accompanying drawings and then point out the invention in the claims.

Figure 1:
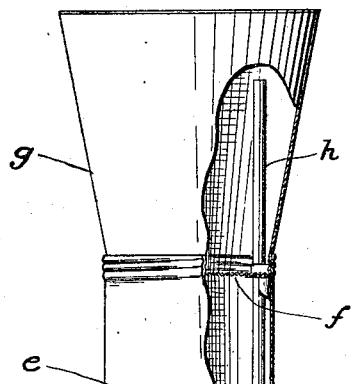
Figure 2:
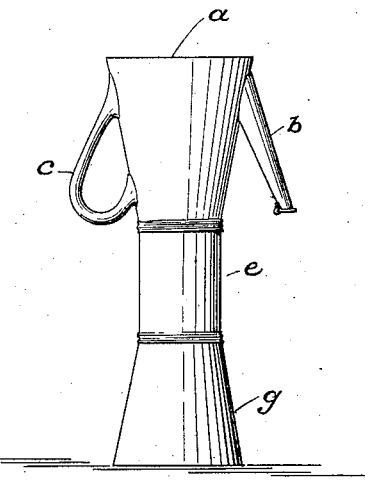
Figure 3:
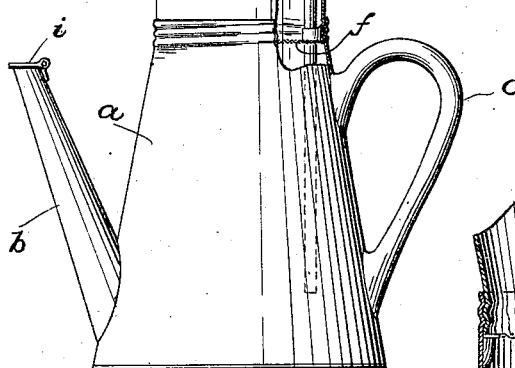
Figure 3:
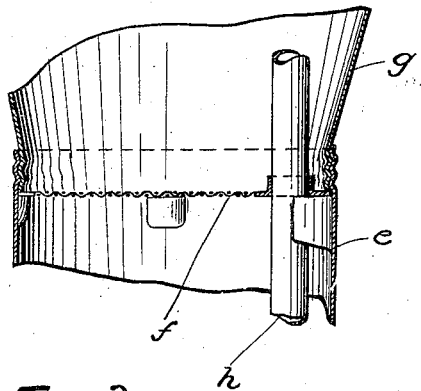

In the drawings, Figure 1 is an elevation, partially broken away. Fig. 2 is an elevation in an inverted position from Fig. 1. Fig. 3 is an enlarged section of a portion of Fig. 1.

*a* is the coffee-pot proper, made of any well-known form or shape and provided with the spout *b* and handle *c*. The top of the pot is provided with a thread with which meshes the thread of the open-ended cylinder or vessel *e*. Both ends of this cylinder or vessel are covered by the screens *f*. Above this cylinder is a vessel *g*, corresponding in capacity and preferably in shape to the pot proper, *a*. The lower end of this vessel *g* is threaded and engages the thread on the upper end of the cylinder *e*. The upper end of this vessel *g* is closed.

*h* is an open-ended pipe extending from vessel *g* through cylinder *e* to pot proper, *a*.

*i* is a cap covering the end of the spout *b*.

In practice with my coffee-pot the coffee is made in the following manner: The coffee is placed in the cylinder *e*, the mesh of the screens *f* being such that the coffee is retained in the cylinder. The coffee-pot proper, *a*, is filled with boiling water and the cap *i* placed on the spout *b*. The vessels *g* and *e* are secured to each other and to the coffee-pot proper, *a*. The apparatus is then inverted from the position shown in Fig. 1, (see Fig. 2,) and the water passes from pot *a* to vessel *g*, passing through cylinder or vessel *e* and the coffee therein contained, the pipe *h* allowing the air in vessel *g* to pass away from said vessel. The apparatus is then reinverted, and the water passes from vessel *g* to vessel *e* through the coffee. I can continue these actions successively until the desired strength is obtained, when I may remove the cap *i* and serve the coffee, or I can remove the vessels *e* and *g* from the pot proper, *a*, and themselves, place an ordinary cover on the pot, and serve in this form.

By the use of this coffee-pot not only is water a number of times passed through the coffee, but there being no opportunity for the vapor to escape all the aroma is retained, and I thus produce a coffee of the desired strength and without any loss of the aroma.

Having now fully described my invention, what I claim, and desire to protect by Letters Patent, is—

1. An apparatus for making coffee, comprising two vessels and an intermediate vessel separated from the first-mentioned vessels by screens, the vessels being secured together so as to form a closed structure, an open-ended pipe extending from one outer vessel to the other outer vessel.

2. An apparatus for making coffee, comprising essentially a coffee-pot, an open-ended vessel, secured to the open end of said pot, a vessel having a closed end secured at its open end to said open-ended vessel, and screens interposed between said open-ended vessel and the pot and vessel to which it is secured, and an open-ended pipe extending from the coffee-pot to the other closed vessel.

In testimony of which invention I have hereunto set my hand, at Philadelphia, on this 24th day of February, 1906.

WM. C. RICHARDSON.

Witnesses:
M. M. HAMILTON,
C. STUART OLMSTED.